(12) United States Patent
Matsunaga et al.

(10) Patent No.: US 9,422,908 B2
(45) Date of Patent: Aug. 23, 2016

(54) VEHICLE CONTROL APPARATUS

(75) Inventors: Masaki Matsunaga, Ashigarakami-gun (JP); Koji Ito, Nagoya (JP); Michihiro Miyashita, Susono (JP); Nobukazu Ueki, Susono (JP); Yasuyuki Mikami, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 219 days.

(21) Appl. No.: 13/979,985

(22) PCT Filed: Jan. 21, 2011

(86) PCT No.: PCT/JP2011/051130
§ 371 (c)(1),
(2), (4) Date: Jul. 16, 2013

(87) PCT Pub. No.: WO2012/098687
PCT Pub. Date: Jul. 26, 2012

(65) Prior Publication Data
US 2013/0304358 A1    Nov. 14, 2013

(51) Int. Cl.
F02D 41/00    (2006.01)
F02N 11/08    (2006.01)
F02D 29/02    (2006.01)

(52) U.S. Cl.
CPC ............ *F02N 11/0814* (2013.01); *F02D 29/02* (2013.01); *F02D 41/00* (2013.01); *F02N 11/0833* (2013.01); *F02N 2200/0801* (2013.01); *F02N 2200/101* (2013.01); *F02N 2200/102* (2013.01); *Y02T 10/48* (2013.01)

(58) Field of Classification Search
CPC ............ F02D 41/00; F02N 2200/0801; F02N 2200/101; F02N 2200/102; F02N 11/0814; Y02T 10/48

USPC ............... 701/110, 112, 113; 123/179.4, 325, 123/406.25, 406.36, 179.3
See application file for complete search history.

(56) References Cited

U.S. PATENT DOCUMENTS

| | | | | |
|---|---|---|---|---|
| 5,772,554 A | * | 6/1998 | Tabata | F16H 9/0204 477/109 |
| 7,848,875 B2 | * | 12/2010 | Nakai | F02D 41/062 123/179.3 |
| 2003/0004635 A1 | * | 1/2003 | Kamiya | B60W 10/06 701/112 |
| 2010/0094512 A1 | * | 4/2010 | Corniglion | B60T 7/12 701/48 |
| 2010/0229815 A1 | * | 9/2010 | Senda | F02N 11/0833 123/179.4 |
| 2012/0065022 A1 | * | 3/2012 | Ohashi | B60W 10/023 477/77 |
| 2013/0304358 A1 | * | 11/2013 | Matsunaga | F02D 41/00 701/110 |

FOREIGN PATENT DOCUMENTS

FR    WO 2008104671 A2 *    9/2008    ............... B60T 7/12
JP    2004218544 A *    8/2004
(Continued)

*Primary Examiner* — Hung Q Nguyen
*Assistant Examiner* — Joshua A Campbell
(74) *Attorney, Agent, or Firm* — Oliff PLC

(57) ABSTRACT

A vehicular control apparatus performs control of enabling idle operation of an internal combustion engine that generates a motive power applied to a driving wheel of a vehicle if a vehicle speed of the vehicle is lower than a predetermined vehicle speed that is set in advance, and disabling idle operation of the internal combustion engine if the vehicle speed of the vehicle is equal to or higher than the predetermined vehicle speed, when the vehicle is in a state other than an acceleration running state. Accordingly, the vehicular control apparatus achieves an effect of making it possible to suppress the consumption of fuel.

6 Claims, 9 Drawing Sheets

(56) References Cited

FOREIGN PATENT DOCUMENTS

| JP | A-2004-218544 | | 8/2004 |
| JP | A-2007-187090 | | 7/2007 |
| JP | 2010209864 A | * | 9/2010 |
| JP | A-2010-209864 | | 9/2010 |
| JP | A-2010-216625 | | 9/2010 |
| JP | 2010285961 A | * | 12/2010 |
| JP | A-2010-281301 | | 12/2010 |
| JP | A-2010-285961 | | 12/2010 |
| WO | WO 2008104671 A2 | * | 9/2008 |

\* cited by examiner

VEHICLE CONTROL APPARATUS

TECHNICAL FIELD

The invention relates to a vehicular control apparatus.

BACKGROUND ART

As a conventional vehicular control apparatus, for example, Patent Document 1 discloses a vehicular control apparatus that performs idle stop control under a predetermined condition. This vehicular control apparatus stops an engine, for example, on the condition that an accelerator be off, that a brake be on, and that the vehicle speed be equal to or lower than a predetermined vehicle speed (e.g., equal to or lower than 20 km/h), and restarts the engine on the condition that the accelerator be off and that the brake be off.

RELATED ART DOCUMENT

Patent Document

Patent Document 1: Japanese Patent Application Publication No. 2010-209864 (JP-2010-209864 A)

SUMMARY OF THE INVENTION

Problem to be Solved by the Invention

By the way, there is a room for further improvement, for example, as to the suppression of the consumption of fuel in the vehicular control apparatus described in the foregoing Patent Document 1.

The invention has been made in view of the foregoing circumstances. It is an object of the invention to provide a vehicular control apparatus that can suppress the consumption of fuel.

Means for Solving the Problem

In order to achieve the aforementioned object, a vehicular control apparatus according to the invention is characterized in that the vehicular control apparatus performs control of enabling idle operation of an internal combustion engine that generates a motive power applied to a driving wheel of a vehicle if a vehicle speed of the vehicle is lower than a predetermined vehicle speed that is set in advance, and disabling the idle operation of the internal combustion engine if the vehicle speed of the vehicle is equal to or higher than the predetermined vehicle speed.

Besides, the aforementioned vehicular control apparatus can be configured to perform control of enabling start of the internal combustion engine if the vehicle speed of the vehicle is lower than the predetermined vehicle speed, and disabling start of the internal combustion engine if the vehicle speed of the vehicle is equal to or higher than the predetermined vehicle speed, when the vehicle is in a state other than an acceleration running state.

Besides, the aforementioned vehicular control apparatus can be configured to perform control of changing a mode of start of the internal combustion engine in accordance with a vehicle speed of the vehicle at a time when braking operation for the vehicle is canceled.

Besides, the aforementioned vehicular control apparatus can be configured to perform control of prohibiting start of the internal combustion engine corresponding to braking operation for the vehicle if the vehicle speed of the vehicle is equal to or higher than the predetermined vehicle speed, during coasting running in which the vehicle is caused to run in a coasting manner with consumption of fuel in the internal combustion engine stopped.

Besides, the aforementioned vehicular control apparatus can be configured to perform control of changing the mode of start of the internal combustion engine on a basis of peripheral environment information on the vehicle.

Besides, the aforementioned vehicular control apparatus can be configured to perform control of changing a mode of start of the internal combustion engine during running of the vehicle with consumption of fuel in the internal combustion engine stopped, in accordance with operation on a change operation member.

Besides, the aforementioned vehicular control apparatus can be configured such that the change operation member can select a drive range that enables start of the internal combustion engine corresponding to braking operation for the vehicle, and a free-running range that disables start of the internal combustion engine corresponding to braking operation for the vehicle, as a shift range.

In order to achieve the aforementioned object, a vehicular control apparatus according to the invention is characterized in that the vehicular control apparatus performs control of enabling start of an internal combustion engine that generates a motive power applied to a driving wheel of a vehicle if a vehicle speed of the vehicle is lower than a predetermined vehicle speed that is set in advance, and disabling start of the internal combustion engine if the vehicle speed of the vehicle is equal to or higher than the predetermined vehicle speed, when the vehicle is in a state other than an acceleration running state.

In order to achieve the aforementioned object, a vehicular control apparatus according to the invention is characterized in that the vehicular control apparatus performs control of changing a mode of start of an internal combustion engine that generates a motive power applied to a driving wheel of a vehicle, in accordance with a vehicle speed of the vehicle at a time when braking operation for the vehicle is canceled.

In order to achieve the aforementioned object, a vehicular control apparatus according to the invention is characterized in that the vehicular control apparatus performs control of prohibiting start of an internal combustion engine corresponding to braking operation for a vehicle if a vehicle speed of the vehicle is equal to or higher than a predetermined vehicle speed that is set in advance, during coasting running in which the vehicle is caused to run in a coasting manner with consumption of fuel in the internal combustion engine, which generates a motive power applied to a driving wheel of the vehicle, stopped.

In order to achieve the foregoing object, a vehicular control apparatus according to the invention is in that the vehicular control apparatus performs control of changing a mode of start of an internal combustion engine, which generates a motive power applied to a driving wheel of a vehicle, during running of the vehicle with consumption of fuel in the internal combustion engine stopped, to one of a mode that enables start of the internal combustion engine corresponding to braking operation for the vehicle, and a mode that disables start of the internal combustion engine corresponding to braking operation for the vehicle, in accordance with operation on a change operation member.

Effect of the Invention

The vehicular control apparatus according to the invention achieves an effect of making it possible to suppress the consumption of fuel.

MODES FOR CARRYING OUT THE INVENTION

The embodiments according to the invention will be described hereinafter in detail on the basis of the drawings. Incidentally, this invention is not limited by these embodiments thereof. Besides, component elements in the following embodiments of the invention include those replaceable by those skilled in the art and easy, or those substantially equivalent thereto.

First Embodiment

Figure 1:
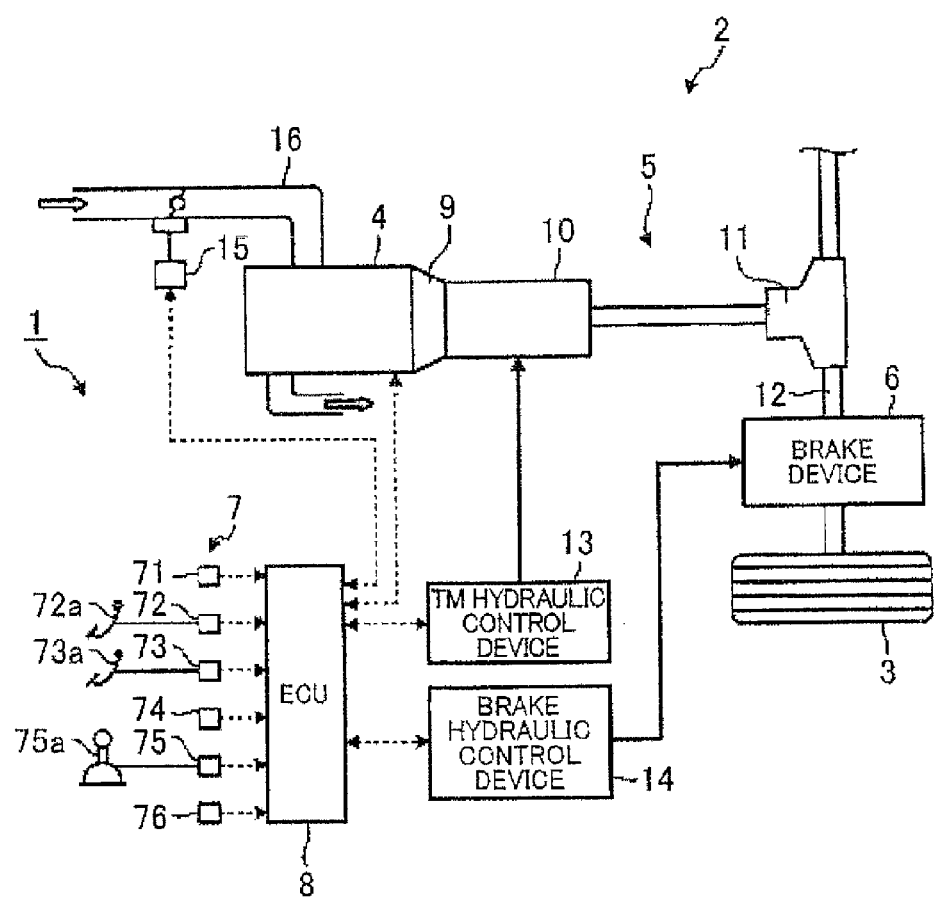
FIG. 1 is a schematic configuration view of a vehicular control system according to a first embodiment of the invention.
Figure 2:
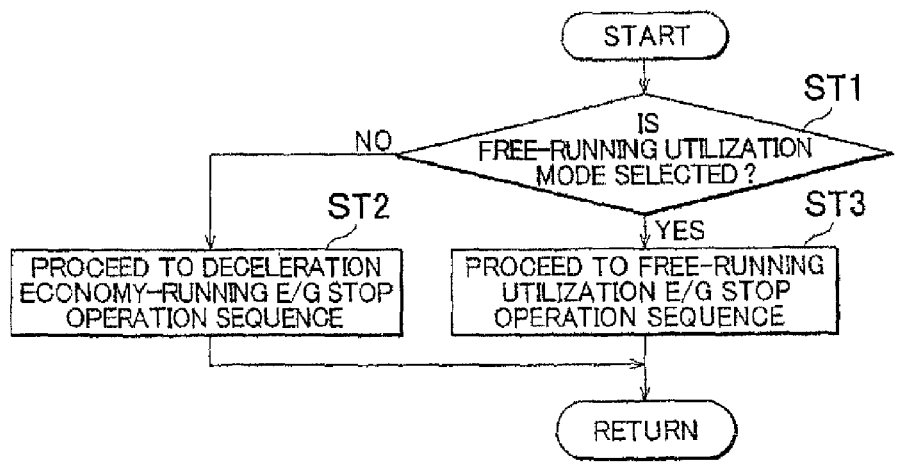
FIG. 2 is a flowchart illustrating an example of control by an ECU.
Figure 3:
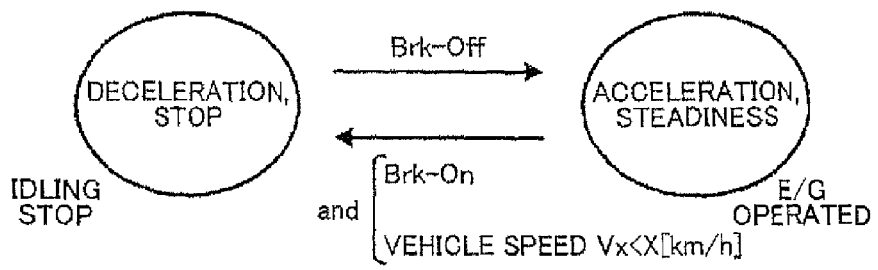
FIG. 3 is a schematic view illustrating an E/G stop operation sequence in a deceleration economy-running mode.
Figure 4:
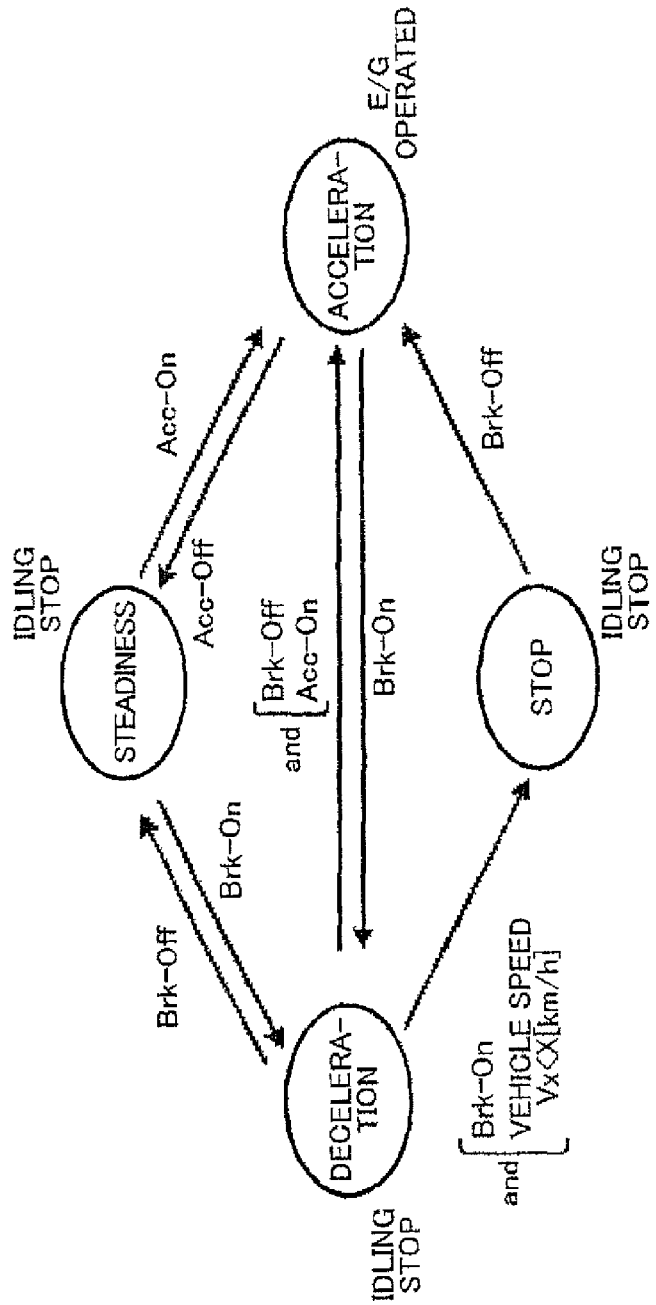
FIG. 4 is a schematic view illustrating an E/G stop operation sequence in a free-running utilization mode.
Figure 5:
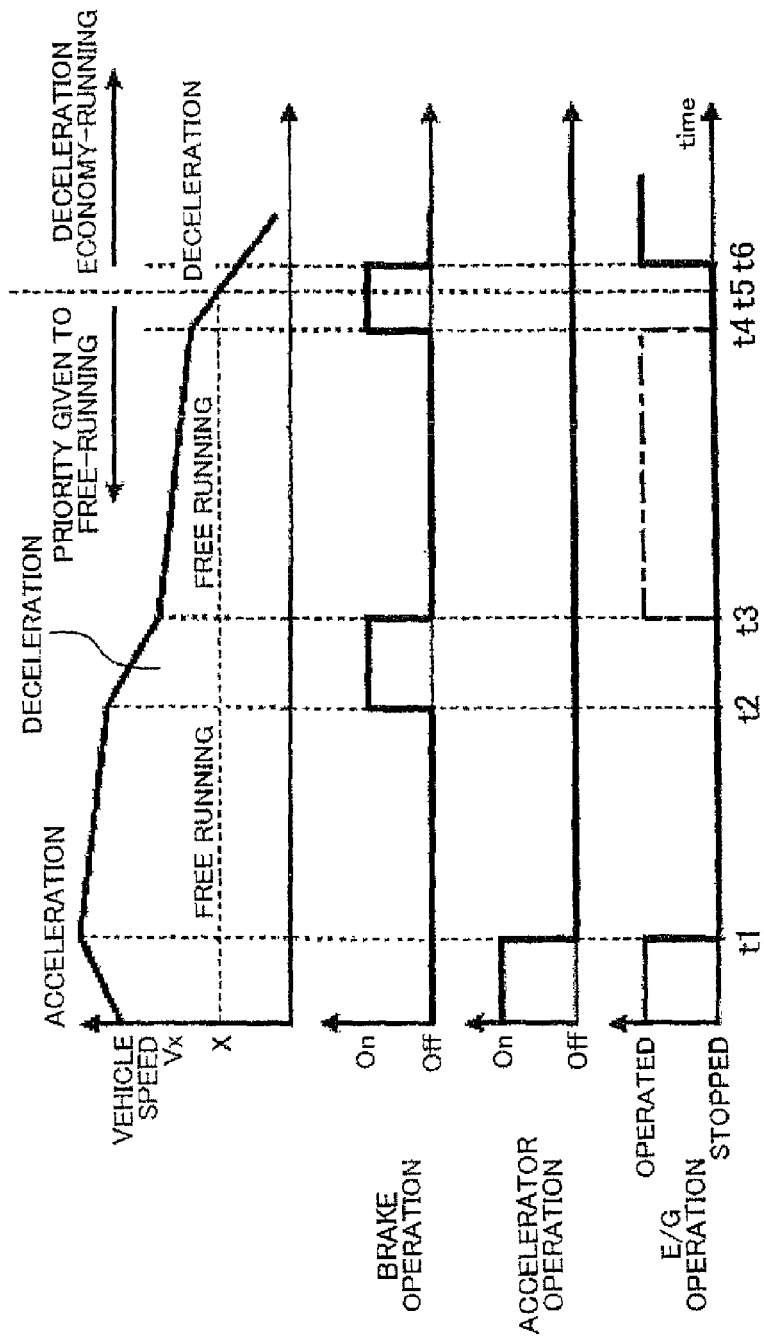
FIG. 5 is a time chart illustrating an example of control by the ECU.

FIG. 1 is a schematic configuration view of a vehicular control system according to the first embodiment of the invention. FIG. 2 is a flowchart illustrating an example of control by an ECU. FIG. 3 is a schematic view illustrating an E/G stop operation sequence in a deceleration economy-running mode. FIG. 4 is a schematic view illustrating an E/G stop operation sequence in a free-running utilization mode. FIG. 5 is a time chart illustrating an example of control by the ECU.

As shown in FIG. 1, a vehicular control system 1 according to this embodiment of the invention is applied to a so-called two pedal-type vehicle 2 that is mounted with a transmission 10 as an automatic, transmission. This vehicular control system 1 is a system for controlling respective portions of this vehicle 2. For example, the vehicular control system 1 is a free-running economy-running system that reduces to the utmost a useless driving range of an engine 4 to suppress the consumption of fuel and achieve an improvement in fuel economy by carrying out so-called free-running in which the engine 4 is stopped from being operated to carry out idling stop during the running of the vehicle 2 and a coasting running state of the vehicle 2 resulting therefrom is utilized.

The vehicular control system 1 is equipped with the engine 4 as an internal combustion engine that generates a motive power for driving a driving wheel 3, a motive power transmission device 5 that constitutes a motive power transmission system that transmits the motive power generated by the engine 4 to the driving wheel 3, a brake device 6 as a braking device of the vehicle 2, a state detection device 7 that detects a state of the vehicle 2, and an ECU 8 as a vehicular control apparatus that controls the respective portions of the vehicle 2 including the vehicular control system 1. The ECU 8 performs free-running S & S (stop & start) operation sequence control in the vehicle 2 that is mounted with the transmission 10 as the automatic transmission.

The engine 4 is a running driving source (a prime mover) that causes the vehicle 2 to run. The engine 4 generates a motive power that is applied to the driving wheel 3 of the vehicle 2 as fuel burns. The engine 4 can make a changeover between an operative state and an inoperative state during the running of the vehicle 2. It should be noted herein that the operative state of the engine 4 (a state in which the engine 4 is operated) is a state of generating a motive power, and a state of outputting thermal energy generated through the combustion of fuel in a combustion chamber in the form of mechanical energy such as a torque or the like. On the other hand, the inoperative state of the engine 4, namely, a state in which the engine 4 is stopped from being operated is a state of stopping the generation of a motive power, and a state of stopping fuel from being supplied to the combustion chamber (fuel cut) and refraining from outputting mechanical energy such as a torque or the like without allowing fuel to burn in the combustion chamber.

The motive power transmission device 5 is configured to include a torque converter 9 as a fluid transfer device equipped with a lockup clutch, the transmission 10 that changes the speed of a motive power from the engine 4 and outputs the motive power, a differential gear 11 that is coupled to the transmission 10, a drive shaft 12 that couples the differential gear 11 and the driving wheel 3 to each other, and the like. The transmission 10 is a so-called automatic transmission that automatically changes the speed ratio (the shift speed) in accordance with the running state of the vehicle 2. For example, various automatic transmissions such as a multi-stage automatic transmission (an AT), a continuously variable transmission (a CVT), a multi-mode manual transmission (an MMT), a sequential manual transmission (an SMT), a dual clutch transmission (a DCT) and the like are applied as the transmission 10. The operation of the transmission 10 is controlled by the ECU 8.

The motive power generated by the engine 4 is input to the transmission 10 via a torque converter 9, changed in speed at a predetermined speed ratio in this transmission 10, and transmitted to the driving wheel 3 via the differential gear 11 and the drive shaft 12. As a result, a driving force (N) is generated on a contact surface of the driving wheel 3 with a road surface, and the vehicle 2 can thereby run.

The brake device 6 applies a braking force to wheels including the driving wheel 3. As a result, a braking force (N) is generated on the contact surface of the driving wheel 3 with the road surface, and the vehicle 2 can thereby be braked.

The state detection device 7 is electrically connected to the ECU 8. The state detection device 7 and the ECU 8 can exchange information such as detection signals, driving signals, control commands and the like with each other. The state detection device 7 includes various sensors, detection devices etc. provided in the respective portions of the vehicle 2, for example, an engine rotational speed sensor 71 that detects an engine rotational speed, an accelerator opening degree sensor 72 that detects an accelerator opening degree as an amount of operation of an accelerator pedal 72a by a driver (an accelerator operation amount), a brake sensor 73 that detects an amount of operation of a brake pedal 73a by the driver, for example, a master cylinder pressure or the like and detects a brake force, a vehicle speed sensor 74 that detects a vehicle speed as a running speed of the vehicle 2, a shift position sensor 75 that detects a position (e.g., a parking range, a reverse range, a neutral range, a drive range or the like) of a shift lever 75a with which the driver performs shift range operation, and the like.

The ECU 8 is an electronic circuit that is mainly constituted by a well-known microcomputer that includes a CPU, a ROM, a RAM, and an interface. An electric signal corresponding to a detection result is input to the ECU 8 from the state detection device 7. In accordance with the input detection result and the like, the ECU 8 controls the motive power transmission device 5 including the engine 4, the transmission 10 and the like, the brake device 6, and the like. In this case, the motive power transmission device 5 including the transmission 10 and the like, and the brake device 6 are hydraulically operated devices that are operated by the pressure of a hydraulic fluid (an oil pressure). The ECU 8 controls the operations of this transmission 10 and this brake device 6 via a TM hydraulic control device 13, a brake hydraulic control device 14 and the like respectively. Besides, the ECU 8 can detect an On/Off state of accelerator operation (Acc) as acceleration operation for the vehicle 2 by the driver, on the basis of, for example, a result of detection by the accelerator opening degree sensor 72. By the same token, the ECU 8 can detect an On/Off state of brake operation (Brk) as braking operation for the vehicle 2 by the driver, on the basis of, for example, a result of detection by the brake sensor 73.

Incidentally, the state in which accelerator operation by the driver is Off (Acc-Off) is a state in which the driver has cancelled acceleration operation for the vehicle 2, and is a state in which the accelerator pedal 72a has been released by the driver and the accelerator opening degree (the accelerator operation amount) detected by the accelerator opening degree sensor 72 has become smaller than a predetermined opening degree. On the other hand, the state in which the accelerator operation by the driver is On (Acc-On) is a state in which the driver performs acceleration operation for the vehicle 2, and a state in which the accelerator pedal 72a has been depressed by the driver and the accelerator opening degree detected by the accelerator opening degree sensor 72 has become equal to or larger than the predetermined opening degree. By the same token, the state in which brake operation by the driver is Off (Brk-Off) is a state in which the driver has cancelled braking operation for the vehicle 2, and a state in which the brake pedal 73a has been released by the driver and the master cylinder pressure (the brake operation amount) detected by the brake sensor 73 has become lower than a predetermined pressure. The state in which brake operation by the driver is On (Brk-On) is a state in which the driver performs braking operation for the vehicle 2, and a state in which the brake pedal 73a has been depressed by the driver and the master cylinder pressure detected by the brake sensor 73 has become equal to or higher than the predetermined pressure.

For example, during normal operation, the ECU 8 controls a throttle device 15 of the engine 4 on the basis of the accelerator opening degree, the vehicle speed, and the like, adjusts the throttle opening degree of an intake passage 16, adjusts the amount of intake air, controls the amount of fuel injection in a manner corresponding to a change in the amount of intake air, adjusts the amount of the mixture with which the combustion chamber is filled, and controls the output of the engine 4. Besides, the ECU 8 controls the TM hydraulic control device 13 on the basis of the accelerator opening degree, the vehicle speed and the like, and controls the speed ratio of the transmission 10.

Then, during the running of the vehicle 2, the ECU 8 can start the engine 4 or stop the operation thereof to make a changeover between an operative state of the engine 4 and an inoperative state of the engine 4. If the driver performs a predetermined operation sequence during the running of the vehicle 2, this vehicular control system 1 can perform fuel cut control for stopping fuel from being supplied to the combustion chamber of the engine 4 as control concerning free-running S & S, carry out idling stop to keep the engine 4 stopped from being operated, and proceed to the control of causing this vehicle 2 to run in a coasting manner (to coast down), that is, holding this vehicle 2 in a free-running state. In a free-running state, the driving wheel 3 and the engine 4 are decoupled from each other in various engagement devices included in the motive power transmission device 5, various clutches for realizing respective shift speeds in the transmission 10, and the like, so that the vehicle 2 assumes a state in which the transmission of motive power between the engine 4 and the driving wheel 3 is suspended (e.g., a state equivalent to a neutral range). As a result, during the running of the vehicle 2, this vehicular control system 1 can carry out sp-called free running to cause the vehicle 2 to run in a coasting manner with the consumption of fuel in the engine 4 stopped and without operating an engine brake or the like, and can achieve an improvement in fuel economy. Then, when the driver performs a predetermined operation sequence, the ECU 8 restarts the engine 4, and can restore normal running in which the vehicle 2 is caused to run again by the motive power generated by the engine 4.

By the way, the vehicular control system 1 according to this embodiment of the invention can select a deceleration economy-running mode (a first running mode) in which the engine 4 is stopped from being operated and idling stop is carried out during deceleration running or stop of the vehicle 2 resulting mainly from brake operation (braking operation) of the driver, and a free-running utilization mode (a second running mode) in which the engine 4 is positively stopped from being operated and idling stop is carried out to utilize the aforementioned free running not only during deceleration running or stop of the vehicle 2 resulting from brake operation, as a running mode of the vehicle 2. In this case, the vehicular control system 1 is equipped with a free-running utilization mode switch 76.

For example, as shown in the flowchart of FIG. 2, the ECU 8 determines, on the basis of an On/Off state of the free-running utilization mode switch 76, whether or not the free-running utilization mode is selected (ST1). If the free-running utilization mode switch 76 is Off and the deceleration economy-running mode is selected as a running mode of the vehicle 2 (ST1: No), the ECU 8 applies a deceleration economy-running E/G stop operation sequence as an operation sequence for stopping the engine 4 from being operated and starting the engine 4 (ST2), ends a current control cycle, and proceeds to a subsequent control cycle. On the other hand, if the free-running-utilization mode switch 76 is On as a result of the driver's operation and the free-running utilization mode is selected as a running mode of the vehicle 2 (ST1: Yes), the ECU 8 applies a free-running utilization E/G stop operation sequence as an operation sequence for stopping the engine 4 from being operated and starting the engine 4 (ST3), ends the current control cycle, and proceeds to the subsequent control cycle.

In the case of the deceleration economy-running mode, the ECU 8 stops the engine 4 from being operated and starts the engine 4, for example, in accordance with a deceleration economy-running E/G stop operation sequence exemplified in FIG. 3. In this case, the ECU 8 decomposes a vehicle state into a state that can be estimated to be "acceleration or steadiness" and a state that can be estimated to be "deceleration or stop", on the basis of the On/Off state of brake operation, a vehicle speed Vx and the like, grasps a transition between the states, and stops the engine 4 from being operated and starts the engine 4 in accordance with this grasped transition.

In the case of the deceleration economy-running mode, if brake operation is turned On (Brk-On) from a state in which brake operation by the driver is Off (Brk-Off) and the vehicle speed Vx of the vehicle 2 detected by the vehicle speed sensor 74 is lower than a deceleration economy-running start vehicle speed X (Km/h) as a predetermined vehicle speed that is set in advance (Vx<X), the ECU 8 stops the engine 4 from being operated, and carries out idling stop. On the other hand, if brake operation by the driver is turned Off (Brk-Off) from a state in which brake operation is On (Brk-On) and the vehicle speed Vx is lower than the deceleration economy-running start vehicle speed X (Km/h) (Vx<X), the ECU 8 starts the engine 4 and makes the engine 4 operative. The deceleration economy-running start vehicle speed X (Km/h) is set in advance on the basis of an actual vehicle evaluation or the like, and is stored in a storage unit of the ECU 8. For example, the deceleration economy-running start vehicle speed X (Km/h) is set to a range from about several (Km/h) to about several tens of (Km/h).

It should be noted herein that the state in which brake operation by the driver is Off (Brk-Off) is a state in which the vehicle state of the vehicle 2 can be estimated to be "acceleration or steadiness". On the other hand, the state in which brake operation by this driver is On (Brk-On) and the vehicle speed Vx is lower than the deceleration economy-running start vehicle speed X (Vx<X) is a state in which the vehicle state of the vehicle 2 can be estimated to be "deceleration or stop".

As a result, the vehicular control system 1 can carry out deceleration economy-running to perform idling stop by stopping the engine 4 from being operated from deceleration running of the vehicle 2 to stop of the vehicle 2 resulting mainly from brake operation of the driver (braking operation), thus making it possible to suppress the consumption of fuel and achieve an improvement in fuel economy.

On the other hand, in the case of the free-running utilization mode, the ECU 8 performs the control of enabling idle operation of the engine 4 if the vehicle speed Vx is lower than the deceleration economy-running start vehicle speed X that is set in advance, and disabling idle operation of the engine 4 if the vehicle speed Vx is equal to or higher than the deceleration economy-running start vehicle speed X. That is, the ECU 8 can change the mode of idle operation of the engine 4 to an idle permission mode that enables idle operation, and an idle prohibition mode that disables idle operation. Then, the ECU 8 sets the mode of idle operation of the engine 4 to the idle permission mode in a state in which the vehicle speed Vx is lower than the deceleration economy-running start vehicle speed X, and sets the mode of idle operation of the engine 4 to the idle prohibition mode in a state in which the vehicle speed Vx is equal to or higher than the deceleration economy-running start vehicle speed X. Incidentally, idle (idling) operation of the engine 4 is operation in which the engine 4 is caused to operate at a lowest possible rotational speed close to a non-load state, for example, operation in which the energy generated by the engine 4 is counterbalanced against the friction generated inside the engine, for example, while driving auxiliaries etc. to a minimum required degree.

In the case of idle prohibition mode, the ECU 8 starts the engine 4 to prohibit idle operation, and keeps the operation of the engine 4 stopped to continue idling stop, even if brake operation is turned Off (Brk-Off), for example, in a state in which brake operation by the driver is On (Brk-On). Besides, in the case of the idle prohibition mode, when accelerator operation is turned On (Acc-On), for example, in a state in which accelerator operation by the driver is Off (Acc-Off), the ECU 8 starts the engine 4 in response thereto, makes the engine 4 operative, and generates an output that can realize a predetermined acceleration state corresponding to accelerator operation.

In other words, in the case of the free-running utilization mode, the ECU 8 performs the control of enabling start of the engine 4 if the vehicle speed Vx is lower than the deceleration economy-running start vehicle speed X when the vehicle 2 is in a state other than a state in which the vehicle 2 runs in an accelerated manner as the driver performs accelerator operation, and disabling start of the engine 4 if the vehicle speed Vx is equal to or higher than the deceleration economy-running start vehicle speed X. That is, if the vehicle 2 runs in a non-accelerated manner, the ECU 8 can change the mode of start of the engine 4 to a start permission mode that enables start of the engine 4, and a start prohibition mode that disables start of the engine 4. Then, if the vehicle speed Vx is lower than the deceleration economy-running start vehicle speed X, the ECU 8 sets the mode of start of the engine 4 to the start permission mode, and sets the mode of start of the engine 4 to the start prohibition mode if the vehicle speed Vx is equal to or higher than the deceleration economy-running start vehicle speed X. Furthermore, in other words, in the case of the free-running utilization mode, the ECU 8 performs the control of changing the mode of start of the engine 4 in accordance with the vehicle speed Vx of the vehicle 2 at the time when braking operation for the vehicle 2 is canceled, namely, at the time when brake operation by the driver is turned Off. In this case, the ECU 8 performs the control of prohibiting the engine 4 from being started in accordance with braking operation for the vehicle 2 if the vehicle speed Vx is equal to or higher than the deceleration economy-running start vehicle speed X during coasting running in which the vehicle 2 is caused to run in a coasting manner with the consumption of fuel in the engine 4 stopped. Thus, for example, when the driver turns brake operation Off after turning brake operation On to adjust the speed during coasting running of the vehicle 2, the ECU 8 can prohibit the engine 4 from being started as this braking operation is canceled.

More specifically, in the case of the free-running utilization mode, the ECU 8 stops the engine 4 from being operated and starts the engine 4 in accordance with, for example, a free-running utilization E/G stop operation sequence exemplified in FIG. 4. In this case, the ECU 8 decomposes the state of the vehicle into four states, namely, a state that can be estimated to be "acceleration", a state that can be estimated to be "steadiness", a state that can be estimated to be "deceleration", and a state that can be estimated to be "stop" on the basis of the On/Off state of brake operation, the On/Off state of accelerator operation, the vehicle speed Vx, and the like, grasps a transition among these states, and stops the engine 4 from being operated and starts the engine 4 in accordance with this grasped transition.

If brake operation is turned On (Brk-On) or acceleration operation is turned Off (Acc-Off) in a state in which brake operation by the driver is Off (Brk-Off) and accelerator operation by the driver is On (Acc-On), the ECU 8 stops the engine 4 from being operated, and carries out idling stop.

It should be noted herein that the state in which brake operation by the driver is Off (Brk-Off) and accelerator operation by the driver is On (Ace-On) is a state in which the vehicle state of the vehicle 2 can be estimated to be "acceleration". Besides, the state in which accelerator operation has been turned Off (Ace-Off) with brake operation by the driver remaining Off (Brk-Off) from the state in which the vehicle state of the vehicle 2 can be estimated to be "acceleration", namely, a state in which both brake operation and accelerator operation have been turned Off (Brk, Ace-Off) is a state in which the vehicle state of the vehicle 2 can be estimated to be "steadiness". Besides, the state in which at least brake operation by the driver has been turned On (Brk-On) from the state in which the vehicle state of the vehicle 2 can be estimated to be "acceleration" is a state in which the vehicle state of the vehicle 2 can be estimated to be "deceleration".

If brake operation by the driver is turned Off (Brk-Off) and accelerator operation is turned On (Ace-On) in a state in which at least brake operation by the driver is On (Brk-On), namely, a state that can be estimated to be "deceleration", the ECU 8 starts the engine 4 and makes the engine 4 operative. Besides, if accelerator operation by the driver is turned On (Ace-On) in a state in which both brake operation and accelerator operation have been turned Off (Brk, Ace-Off), namely, a state that can be estimated to be "steadiness", the ECU 8 starts the engine 4 and makes the engine 4 operative. Besides, if brake operation by the driver is turned On (Brk-On) in a state in which both brake operation and accelerator operation have been turned Off (Brk, Ace-Off), namely, a state that can be estimated to be "steadiness", the ECU 8 keeps the operation of the engine 4 stopped, and continues idling stop.

Then, if brake operation is turned Off (Brk-Off) in a state in which brake operation by the driver is On (Brk-On) and the vehicle speed Vx is lower than the deceleration economy-running start vehicle speed X (Vx<X), the ECU 8 starts the engine 4 and makes the engine 4 operative. The state in which brake operation by this driver is On (Brk-On) and the vehicle speed Vx is lower than the deceleration economy-running start vehicle speed X (Vx<X) is a state in which the vehicle state of the vehicle 2 can be estimated to be "stop" or "deceleration" leading to "stop", and a state in which the mode of idle operation of the engine 4 is the idle permission mode and the mode of start of the engine 4 is the start permission mode. Thus, if brake operation is turned Off (Brk-Off) in a state in which brake operation by the driver is On (Brk-On) and the vehicle speed Vx is lower than the deceleration economy-running start vehicle speed X (Vx<X), this vehicular control system 1 can start the engine 4 and accelerate the vehicle 2 in accordance with the intention of the driver to take off, accelerate etc.

On the other hand, if brake operation is turned Off (Brk-Off) in a state in which brake operation by the driver is On (Brk-On) and the vehicle speed Vx is equal to or higher than the deceleration economy-running start vehicle speed X (Vx≥X), the ECU 8 keeps the operation of the engine 4 stopped, and continues idling stop. The state in which brake operation by this driver is On (Brk-On) and the vehicle speed Vx is equal to or higher than the deceleration economy-running start vehicle speed X (Vx≥X) is a state in which the vehicle state of the vehicle 2 can be estimated to be "deceleration" during free running (coasting running), for example, "deceleration" for adjusting the speed during free running, and a state in which the mode of idle operation of the engine 4 is the idle prohibition mode and the mode of start of the engine 4 is the start prohibition mode. Thus, if brake operation is turned Off (Brk-Off) in a state in which brake operation by the driver is On (Brk-On) and the vehicle speed Vx is equal to or higher than the deceleration economy-running start vehicle speed X (Vx≥X), this vehicular control system 1 can keep the operation of the engine 4 stopped in preparation for free running after the adjustment of the speed, and as a result, can restrain the engine 4 from being inadvertently restarted in the case where the continuation of free running is desired after brake operation for adjusting the speed during free running is performed.

That is, in the case of the free-running utilization mode, the ECU 8 decomposes "deceleration" as the vehicle state of the vehicle 2 further into two states, namely, a state that can be estimated to be "deceleration" leading to "stop", and a state that can be estimated to be "deceleration" for adjusting the speed, on the basis of the vehicle speed Vx and the like, grasps a transition between the states, and changes the mode of idle operation of the engine 4 and the mode of start of the engine 4 in accordance with this grasped transition.

As a result, the vehicular control system 1 can positively stop the engine 4 from being operated, carry out idling stop, and utilize free running not only during deceleration running or stop of the vehicle 2 resulting from brake operation. Then, even if the driver adjusts the speed through a predetermined operation, for example, brake operation during free running with the vehicle speed Vx being relatively high, the vehicular control system 1 can continue free running and maintain the effect of reducing the consumption of fuel without inducing wasteful start of the engine through this brake operation.

Incidentally, the ECU 8 may make a changeover from the free-running utilization mode to the deceleration economy-running mode, in other words, a changeover from the free-running utilization E/G stop operation sequence to the deceleration economy-running E/G stop operation sequence, in accordance with Off operation of the free-running utilization mode switch 76 by the driver. For example, if the vehicle speed Vx becomes lower than the deceleration economy-running start vehicle speed X, the ECU 8 may automatically turn the free-running utilization mode switch 76 and automatically make the changeover. In any case, as in the case of the foregoing, the ECU 8 can make a changeover between the mode of idle operation of the engine 4 and the mode of start of the engine 4, in accordance with the vehicle speed Vx. Incidentally, in the case where the changeover is automatically made when the vehicle speed Vx has become lower than the deceleration economy-running start vehicle speed X, the driver performs the operation of turning the free-running utilization mode switch 76. On again after the stop of the vehicle, if desiring to continue the free-running utilization mode.

Next, an example of control by the ECU 8 will be described with reference to the time chart of FIG. 5. In this FIG. 5, the axis of abscissa is a time axis (time), and the axis of ordinate represents the vehicle speed Vx, the On/Off state of brake operation, the On/Off state of acceleration operation, and the operation state of the engine (E/G) 4.

In the case where the free-running utilization E/G stop operation sequence (see FIG. 4) is applied, if acceleration operation is turned Off at a time t1 during acceleration of the vehicle 2 with brake operation being Off and with acceleration operation being On, the ECU 8 stops the engine 4 from being operated and carries out idling stop. Thus, the vehicle 2 assumes a free-running state. At this time, the ECU 8 sets the mode of idle operation of the engine 4 and the mode of start of the engine 4 to the idle prohibition mode and the start prohibition mode, respectively.

Then, if brake operation is turned On to adjust the speed at a time t2, the ECU 8 controls the brake device 6 via the brake hydraulic control device 14 or the like, and decelerates the vehicle 2. After that, if brake operation is turned Off again at a time t3, the ECU 8 keeps the operation of the engine 4 stopped despite the turning Off of brake operation, and continues idling stop, because the vehicle speed Vx at this time is equal to or higher than the deceleration economy-running start vehicle speed X. Thus, the vehicle 2 assumes a free-running state again after brake operation is turned Off.

In this case, if it is assumed that the ECU 8 has applied the E/G stop operation sequence to the aforementioned deceleration economy running, wasteful start of the engine 4 is inadvertently induced after brake operation is turned Off at a time t3, as exemplified by an alternate long and short dash line in FIG. 5, and fuel whose consumption ought to be suppressed intrinsically by carrying out free running may be consumed.

However, by applying the free-running utilization E/G stop operation sequence as described above, this ECU 8 can restrain the engine 4 from being wastefully started after brake operation is turned Off at the time t3, can smoothly continue free running regardless of brake operation, acceleration operation and the like, and can thereby suppress the consumption of fuel.

Then, if brake operation is turned On at a time t4, the ECU 8 controls the brake device 6 via the brake hydraulic control device 14 or the like to decelerate the vehicle 2. After that, if the vehicle speed Vx becomes lower than the deceleration economy-running start vehicle speed X at a time t5, the ECU 8 changes the mode of idle operation of the engine 4 and the mode of start of the engine 4 to the idle permission mode and the start permission mode respectively, in accordance with this decrease in the vehicle speed Vx. Thus, if brake operation is turned Off again at a time t6, the ECU 8 can start the engine 4 in preparation for takeoff, acceleration and the like.

Incidentally, as an art that is applied to such a vehicle, for example, there is an art concerning speed maintenance control in which an upper-limit speed and a lower-limit speed are set above and below a target speed, a vehicle is accelerated to the upper-limit speed with an engine used as a driving source, the engine is stopped and the vehicle is caused to run in a coasting manner after the vehicle speed has reached the upper-limit speed, the engine is restarted after the vehicle speed has reached the lower-limit speed, the vehicle is accelerated again to the upper-limit speed with the engine used as the driving source, and this process is repeated to maintain the speed of the vehicle. However, in this art concerning speed maintenance control, steady running is simply carried out as a whole by repeating acceleration running with the engine On and coasting running with the engine Off, with a view to maintaining the speed between the upper-limit speed and the lower-limit speed. If a predetermined operation is performed, for example, if brake operation is turned On (or if accelerator operation is turned On), speed maintenance control is canceled, namely, a return to normal running is simply made with the concepts of the upper-limit speed and the lower-limit speed eliminated. Accordingly, even if the art concerning such speed maintenance control is combined with the art of stopping the engine on the condition that the accelerator be off, that the brake be on, and that the vehicle speed be equal to or lower than a predetermined vehicle speed, the vehicular control system 1 and the ECU 8 according to this embodiment of the invention cannot be easily derived.

Even if the driver adjusts the speed through a predetermined operation, for example, brake operation during free running with the vehicle speed Vx being relatively high, the vehicular control system 1 and the ECU 8 according to the embodiment of the invention described above can continue free running and maintain the effect of reducing fuel consumption without inducing wasteful start of the engine through this operation, and thus can further suppress the consumption of fuel and achieve an improvement in fuel economy. Besides, this ECU 8 can realize a system that suppresses the consumption of fuel without causing any waste while making compatible the deceleration economy-running E/G stop operation sequence corresponding to the function of the deceleration economy-running mode, and the free-running utilization E/G stop operation sequence corresponding to the function of the free-running utilization mode.

Second Embodiment

Figure 6:
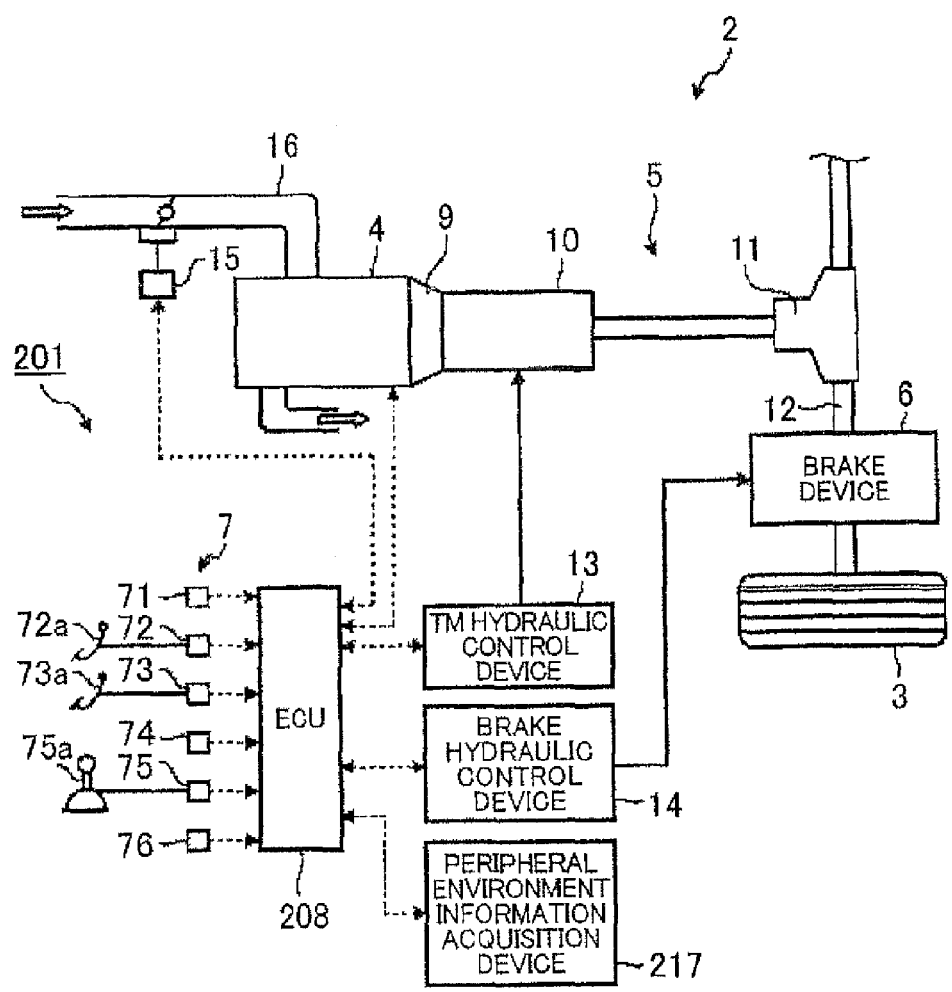
FIG. 6 is a schematic configuration view of a vehicular control system according to a second embodiment of the invention.
Figure 7:
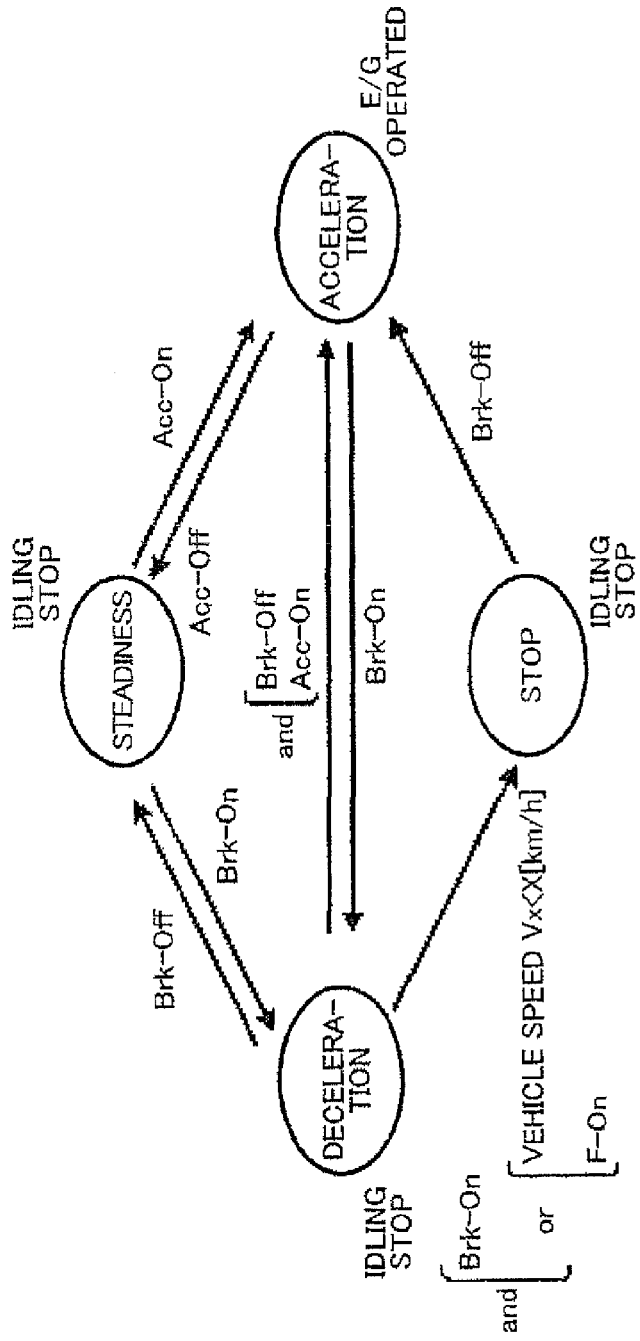
FIG. 7 is a schematic view illustrating an E/G stop operation sequence in a free-running utilization mode.

FIG. 6 is a schematic configuration view of a vehicular control system according to the second embodiment of the invention. FIG. 7 is a schematic view illustrating an E/G stop operation sequence in a free-running utilization mode. The vehicular control apparatus according to the second embodiment of the invention is different from the first embodiment of the invention in that control is performed on the basis of peripheral environment information. Moreover, redundant description of the configurational details, operations and effects that are common to the foregoing embodiment of the invention will be omitted to the utmost, and the same reference symbols will be used (the same holds true for the embodiment of the invention that will be described below).

A vehicular control system 201 according to this embodiment of the invention shown in FIG. 6 is equipped with a peripheral environment information acquisition device 217 that acquires peripheral environment information on the vehicle 2. An ECU 208 as the vehicular control apparatus according to this embodiment of the invention performs the control of changing the mode of start of the engine 4 and the mode of idle operation of the engine 4, on the basis of the peripheral environment information on the vehicle 2 that has been acquired by the peripheral environment information acquisition device 217.

The peripheral environment information acquisition device 217 is, for example, a device that acquires information on a peripheral environment of the vehicle 2 as a host vehicle. For example, the peripheral environment information acquisition device 217 is constituted of various devices such as a device that transmits/receives various pieces of information from a transmitter-receiver such as an optical beacon or the like installed on a road side to a road-to-vehicle communicator of the vehicle 2, an in-vehicle camera, a radar, a GPS device, a navigation device, a vehicle-to-vehicle communication instrument, a device that receives information from a vehicle information and communication system (VICS) or the like, etc.

As peripheral environment information on the vehicle 2, the peripheral environment information acquisition device 217 acquires, for example, current position information on the vehicle 2, map information, infrastructure information (e.g., road information on a road on which the vehicle 2 runs, lighting cycle information on a green light, a yellow light, and a red light of a traffic light located ahead in a running direction of the vehicle 2, traffic light change timing information), and the like. On the basis of these pieces of information, the ECU 208 performs the control of changing the mode of start of the engine 4 and the mode of idle operation. The ECU 208 estimates the driver's intention to brake, for example, on the basis of these pieces of information, and sets the mode of start of the engine 4 to the start permission mode and sets the mode of idle operation to the idle permission mode when the vehicle 2 is estimated to be stopped etc.

More specifically, the ECU 208 estimates, on the basis of peripheral environment information acquired by the peripheral environment information acquisition device 217, whether or not the driver is likely to perform braking operation, and turns a driver braking operation flag F On/Off in accordance with this estimated result. For example, the ECU 208 determines, on the basis of peripheral environment information, whether or not there is a curve of R (curvature)<X (m) within Y (m) ahead in a running direction of a road on which the vehicle is running now, whether or not the distance to a subsequent traffic light located ahead in the running direction is equal to or shorter than Z (m), whether or not the traffic light remains red for a period equal to or longer than P (sec), whether or not the time until the traffic signal turns red is equal to or shorter than Q (sec), and the like. It should be noted herein that the aforementioned X (m), Y (m), Z (m), P (sec), Q (sec) and the like may be appropriately set in advance. If it is determined that there is a curve of R (curvature)<X (m) within Y (m) ahead in the running direction on the road on which the vehicle is running now, the ECU 208 turns the driver braking operation flag F On. Besides, for example, if it is determined that the distance to the subsequent traffic light located ahead in the running direction is equal to or shorter than Z (m) and that the traffic light remains red for a period equal to or longer than P (sec) or that the time until the traffic light turns red is equal to or shorter than Q (sec), the ECU 208 turns the driver braking operation flag F On. In cases other than the foregoing, the ECU 208 turns the driver braking operation flag F Off.

Then, in the case of the free-running utilization mode, the ECU 208 stops the engine 4 from being operated and starts the engine 4, for example, in accordance with a free-running utilization E/G stop operation sequence exemplified in FIG. 7.

If brake operation is turned Off (Brk-Off) in a state in which brake operation by the driver is On (Brk-On) and the vehicle speed Vx is lower than the deceleration economy-running start vehicle speed X (Vx<X) or in a state in which brake operation by the driver is On (Brk-On) and the driver braking operation flag F is On (F-On), the ECU 208 starts the engine 4 and makes the engine 4 operative. This state in which brake operation by the driver is On (Brk-On) and the driver braking operation flag F is On (F-On) is a state that can be estimated to be "deceleration" in which the driver is likely to positively perform braking operation, and a state in which the mode of idle operation of the engine 4 is the idle permission mode and the mode of start of the engine 4 is the start permission mode. Thus, if brake operation is turned Off (Brk-Off) in a state in which brake operation by the driver is On (Brk-On) and the driver braking operation flag F is On (F-On), this vehicular control system 201 can start the engine 4 and accelerate the vehicle 2, in accordance with the driver's intention to take off and accelerate after the positive performance of braking operation.

On the other hand, if brake operation is turned Off (Brk-Off) in a state in which brake operation by the driver is On (Brk-On), the vehicle speed Vx is equal to or higher than the deceleration economy-running start vehicle speed X (Vx≥X), and also the driver braking operation flag F is Off (F-Off), the ECU 208 keeps the engine 4 stopped from being operated, and continues idling stop. This state in which brake operation by the driver is On (Brk-On), the vehicle speed Vx is equal to or higher than the deceleration economy-running start vehicle speed X (Vx≥X), and also the driver braking operation flag F is Off (F-Off) is a state that can be estimated to be "deceleration" with the vehicle state of the vehicle 2 being free running (coasting running), for example, "deceleration" for adjusting the speed during free running, and a state in which the mode of idle operation of the engine 4 is the idle prohibition mode and the mode of start of the engine 4 is the start prohibition mode. Thus, if brake operation is turned Off (Brk-Off) in a state in which brake operation by the driver is On (Brk-On), the vehicle speed Vx is equal to or higher than the deceleration economy-running start vehicle speed X (Vx≥X), and also the driver braking operation flag F is Off (F-Off), this vehicular control system 201 can keep the operation of the engine 4 stopped in preparation for free running after the adjustment of the speed. As a result, if the continuation of free running is desired after brake operation for adjusting the speed during free running is performed, the engine 4 can be restrained from being inadvertently restarted.

In accordance with the vehicular control system 201 and the ECU 208 according to the embodiment of the invention described above, even if the driver adjusts the speed through a predetermined operation, for example, brake operation during free running with the vehicle speed Vx being relatively high, the effect of reducing the consumption of fuel can be maintained by continuing free running without inducing the wasteful start of the engine through this operation, and hence it is possible to further suppress the consumption of fuel and achieve an improvement in fuel economy. Then, on the basis of peripheral environment information on the vehicle 2, the vehicular control system 201 and the ECU 208 perform the control of changing the mode of start of the engine 4 and the mode of idle operation. Accordingly, the vehicular control system 201 and the ECU 208 can enhance the accuracy in making a determination on the driver's intention to brake, can appropriately change various modes in accordance with this enhancement of the determination accuracy, and hence can reduce the sense of discomfort caused to the driver.

Third Embodiment

Figure 8:
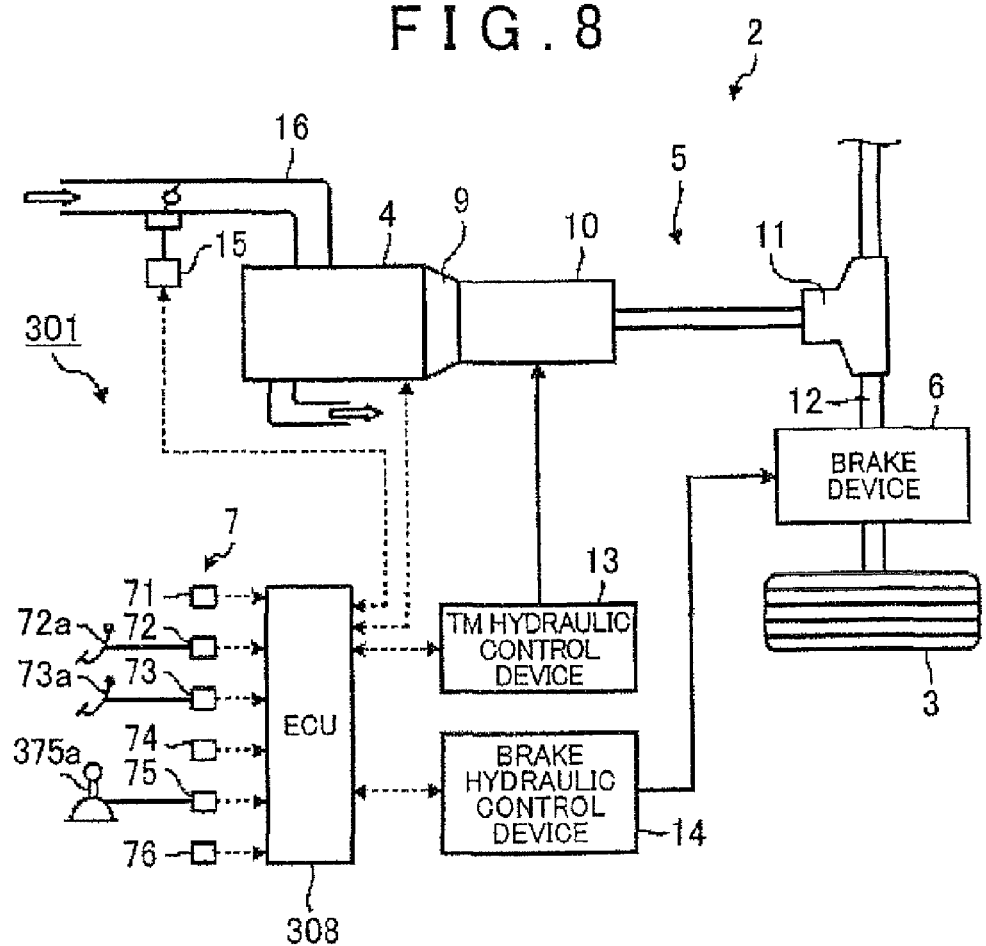
FIG. 8 is a schematic configuration view of a vehicular control system according to a third embodiment of the invention.
Figure 9:
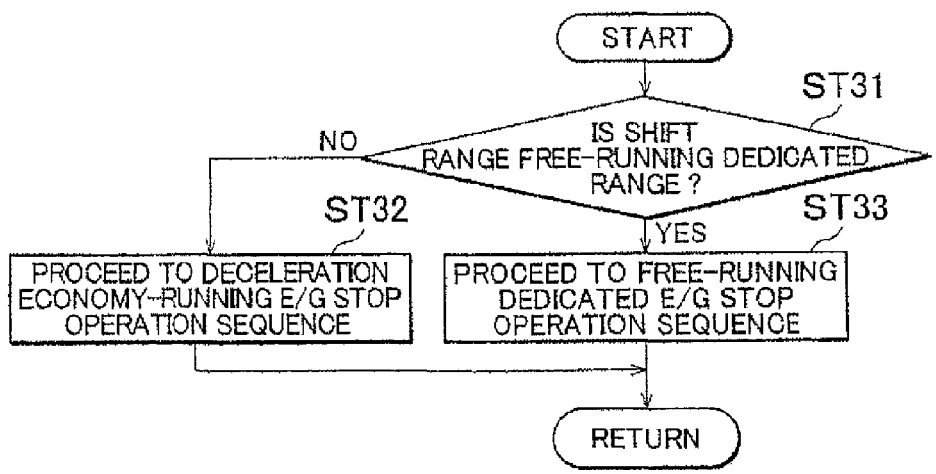
FIG. 9 is a flowchart illustrating an example of control by an ECU.
Figure 10:
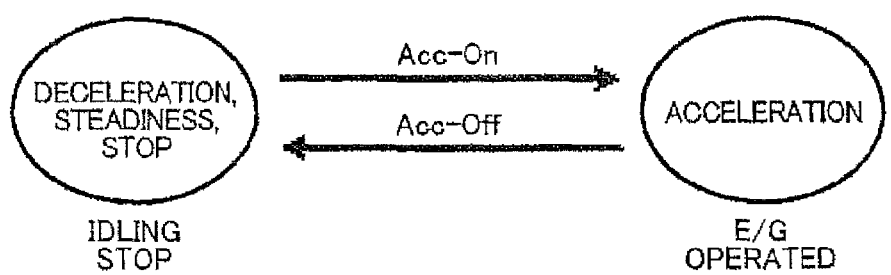
FIG. 10 is a schematic view illustrating an E/G stop operation sequence in a free-running dedicated mode.
Figure 11:
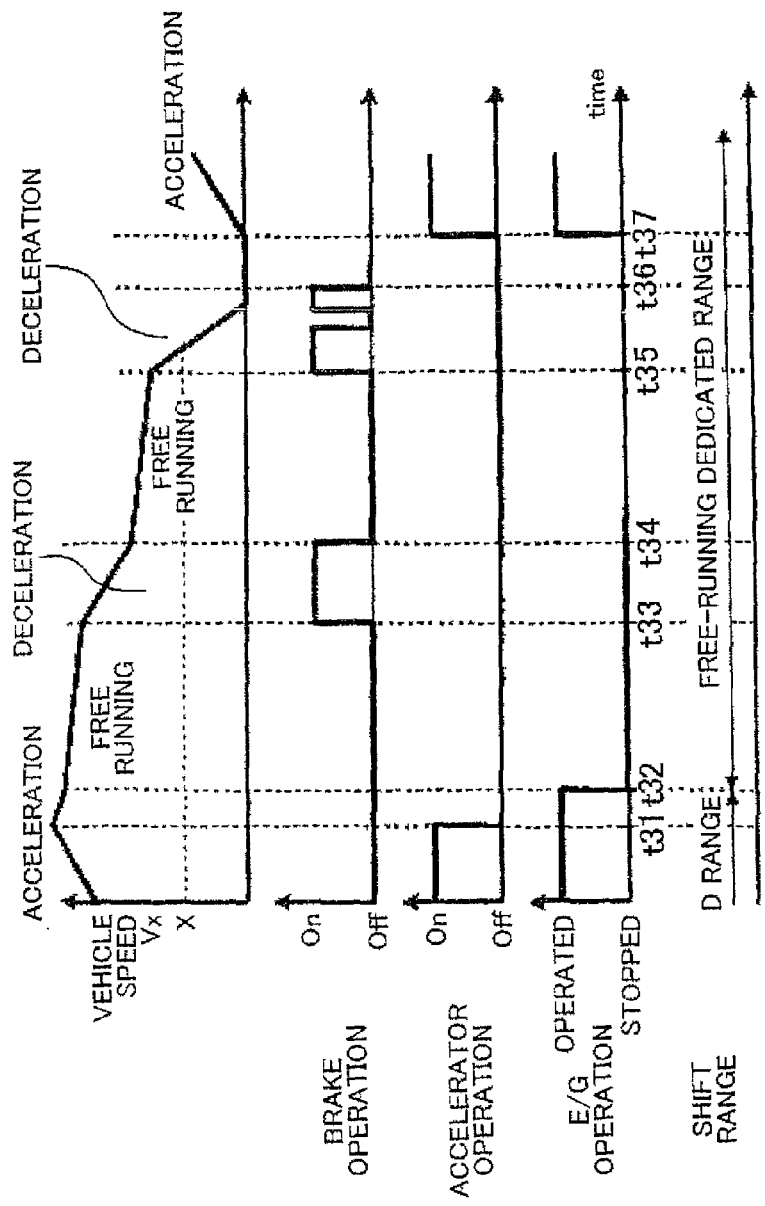
FIG. 11 is a time chart illustrating an example of control by an ECU.

FIG. 8 is a schematic configuration view of a vehicular control system according to the third embodiment of the invention. FIG. 9 is a flowchart illustrating an example of control by an ECU. FIG. 10 is a schematic view illustrating an E/G stop operation sequence in a free-running dedicated mode. FIG. 11 is a time chart illustrating an example of control by the ECU. The vehicular control apparatus according to the third embodiment of the invention is different from the first embodiment of the invention in having the free-running dedicated mode instead of the free-running utilization mode.

The vehicular control system 301 according to this embodiment of the invention shown in FIG. 8 is equipped with an ECU 308 as the vehicular control apparatus. The ECU 308 performs the control of changing the mode of start of the engine 4 and the mode of idle operation during the running of the vehicle 2 with the consumption of fuel in the engine 4 stopped, in accordance with the operation performed on a shift lever 375a as a change operation member.

The shift lever 375a according to this embodiment of the invention can also select a free-running dedicated range (a free-running range) in addition to a parking range, a reverse range, a neutral range, a drive range and the like, for example, as a shift range. The drive range is a range that enables start of the engine 4 corresponding to brake operation (braking operation) for the vehicle 2 by the driver. The free-running dedicated range is a range that disables start of the engine 4 corresponding to brake operation for the vehicle 2 by the driver. Incidentally, in this case, the parking range, the reverse range, and the neutral range are also ranges that enable start of the engine 4 corresponding to brake operation (braking operation) for the vehicle 2 by the driver.

For example, as shown in the flowchart of FIG. 9, the ECU 308 determines, on the basis of a result of detection of the shift position sensor 75, whether or not the shift range is the free-running dedicated range (ST31). If it is determined that the shift range is not the free-running dedicated range (ST31: No), namely, if the deceleration economy-running mode is selected as the running mode of the vehicle 2, the ECU 308 applies a deceleration economy-running E/G stop operation sequence as an operation sequence for stopping the engine 4 from being operated and starting the engine 4 (ST32), ends the current control cycle, and proceeds to a subsequent control cycle. If it is determined that the shift range is the free-running dedicated range (ST31: Yes), namely, if the free-running dedicated mode is selected as the running mode of the vehicle 2, the ECU 308 applies a free-running dedicated stop operation sequence as an operation sequence for stopping the operation of the engine 4 and starting the engine 4 (ST33), ends the current control cycle, and proceeds to a subsequent control cycle.

In the case of the deceleration economy-running mode, the ECU 308 sets the mode of idle operation of the engine 4 and the mode of start of the engine 4 to the idle permission mode that enables idle operation and the start permission mode that enables start of the engine 4 corresponding to brake operation, respectively, and stops the engine 4 from being operated and starts the engine 4 in accordance with the aforementioned deceleration economy-running E/G stop operation sequence exemplified in FIG. 3.

On the other hand, in the case of the free-running dedicated mode, the ECU 308 sets the mode of idle operation of the engine 4 and the mode of start of the engine 4 to the idle prohibition mode that disables idle operation and the start prohibition mode that disables start of the engine 4 corresponding to brake operation, respectively, and stops the engine 4 from being operated and starts the engine 4 in accordance with a free-running dedicated stop operation sequence exemplified in FIG. 10. In this case, the ECU 308 decomposes the vehicle state into two states, namely, a state that can be estimated to be "acceleration" and a state that can be estimated to be "deceleration, steadiness or stop" on the basis of the On/Off state of accelerator operation, grasps a transition between the states, and stops the engine 4 from being operated and starts the engine 4 in accordance with this grasped transition.

In the case of the free-running dedicated mode, if accelerator operation is turned Off (Acc-Off) in a state in which accelerator operation by the driver is On (Acc-On), the ECU 308 stops the engine 4 from being operated, and carries out idling stop. On the other hand, if accelerator operation is turned On (Acc-On) in a state in which accelerator operation by the driver is Off (Acc-Off), the ECU 308 starts the engine 4 and makes the engine 4 operative. In other words, in the case where the free-running dedicated E/G stop operation sequence is applied, the ECU 308 directly associates the On/Off state of accelerator operation and the start/stop of the engine 4 with each other regardless of brake operation or the like. That is, the ECU 308 starts the engine 4 and makes the engine 4 operative if the driver turns accelerator operation On, and stops the engine 4 from being operated and carries out idling stop if the driver turns accelerator operation Off.

It should be noted herein that the state in which accelerator operation by the driver is On (Acc-On) is a state in which the vehicle state of the vehicle 2 can be estimated to be "acceleration". On the other hand, the state in which accelerator operation by the driver is Off (Acc-Off) is a state in which the vehicle state of the vehicle 2 can be estimated to be "deceleration, steadiness, or stop".

As a result, in the case of the free-running dedicated mode, the vehicular control system 301 can positively stop the engine 4 from being operated, carry out idling stop, and utilize free running not only during deceleration running and stop of the vehicle 2 resulting from brake operation.

Next, an example of control by the ECU will be described with reference to the time chart of FIG. 11. In this FIG. 11, the axis of abscissa is a time axis (time), and the axis of ordinate represents the vehicle speed Vx, the On/Off state of brake operation, the On/Off state of accelerator operation, the operation state of the engine (E/G) 4, and the shift range.

For example, if the driver turns accelerator operation Off at a time t31 and changes over the shift range from the drive range to the free-running dedicated range by the shift lever 375a at a time t32 during acceleration of the vehicle 2 with accelerator operation being On, the ECU 308 applies the free-running dedicated E/G stop operation sequence (see FIG. 10) as an operation sequence for stopping the engine 4 from being operated and starting the engine 4. In accordance with this application, the ECU 308 stops the engine 4 from being operated and carries out idling stop at the time t32. Then, even if the driver turns brake operation On/Off at a time t33, a time t34, a time t35, a time 36 and the like during a period in which the free-running dedicated range is selected as the shift range, the ECU 308 prohibits the performance of idle operation regardless of this turning On/Off of brake operation, keeps the operation of the engine 4 stopped, and continues idling stop. Then, if the driver turns accelerator operation On at a time t37, the ECU 308 starts the engine 4 in accordance with this turning On of accelerator operation, makes the engine 4 operative, and generates an output that can realize a predetermined acceleration state corresponding to accelerator operation.

In accordance with the vehicular control system 301 and the ECU 308 according to the embodiment of the invention described above, even if the driver adjusts the speed through a predetermined operation, for example, brake operation during free running with the vehicle speed Vx being relatively high, the effect of reducing the consumption of fuel can be maintained by continuing free running without inducing the wasteful start of the engine through this operation, and hence it is possible to further suppress the consumption of fuel and achieve an improvement in fuel economy.

Then, the vehicular control system 301 and the ECU 308 perform the control of changing the mode of start of the engine 4 during the running of the vehicle 2 with the consumption of fuel in the engine 4 stopped, in accordance with the operation on the shift lever 375a. Accordingly, the vehicular control system 301 and the ECU 308 can be configured such that the mode in which the engine 4 is started in accordance with brake operation and the mode in which the engine 4 is not started in accordance with brake operation can be clearly selected by the driver's intention through the operation on the shift lever 375a by the driver. Thus, the vehicular control system 301 and the ECU 308 make a changeover between the drive range or the like and the free-running dedicated range, and thereby select the modes with different engine start conditions, and can appropriately manage the running state and the reduction of fuel consumption. For example, the vehicular control system 301 and the ECU 308 can avoid the start of the engine after the adjustment of the speed through brake operation and achieve an improvement in fuel economy, by the driver's intention.

Incidentally, the vehicular control apparatus according to each of the foregoing embodiments of the invention is not limited to each of the foregoing embodiments of the invention, but can be modified in various manners within the scope described in the claims. The vehicular control apparatus according to each of these embodiments of the invention may be configured by combining a plurality of the embodiments of the invention described above. For example, the third embodiment of the invention can be combined with the first embodiment of the invention.

The vehicle described above may be a so-called "hybrid vehicle" that is equipped with a motor-generator as an electric motor capable of generating electricity or the like in addition to the engine 4, as a running motive power source.

DESCRIPTION OF REFERENCE SYMBOLS

- 1, 201, 301 . . . VEHICULAR CONTROL SYSTEM
- 2 . . . VEHICLE
- 3 . . . DRIVING WHEEL
- 4 . . . ENGINE (INTERNAL COMBUSTION ENGINE)
- 5 . . . MOTIVE POWER TRANSMISSION DEVICE
- 6 . . . BRAKE DEVICE
- 7 . . . STATE DETECTION DEVICE
- 8, 208, 308 . . . ECU (VEHICULAR CONTROL APPARATUS)
- 76 . . . FREE-RUNNING UTILIZATION MODE SWITCH
- 217 . . . PERIPHERAL ENVIRONMENT INFORMATION ACQUISITION DEVICE
- 375a . . . SHIFT LEVER (CHANGE OPERATION MEMBER)

The invention claimed is:

1. A vehicle control apparatus comprising:
an electronic control unit configured to perform control of setting a start mode of an internal combustion engine, which generates a motive power applied to a driving wheel of a vehicle, during running of the vehicle with consumption of fuel in the internal combustion engine stopped, wherein
when a speed of the vehicle is lower than a predetermined vehicle speed, the electronic control unit sets the vehicle to a mode that enables start of the internal combustion engine corresponding to braking operation for the vehicle; and
when the speed of the vehicle is equal to or higher than the predetermined vehicle speed, the electronic control unit sets the vehicle to a mode that disables start of the internal combustion engine corresponding to braking operation for the vehicle.

2. The vehicle control apparatus according to claim 1, wherein when the speed of the vehicle is equal to or higher than the predetermined vehicle speed, and the vehicle runs in a coasting manner with consumption of fuel in the internal combustion engine stopped, the electronic control unit is configured to perform control of prohibiting start of the internal combustion engine corresponding to braking operation for the vehicle.

3. The vehicle control apparatus according to claim 1, wherein the electronic control unit is configured to perform control of changing a mode of start of the internal combustion engine, during running of the vehicle with consumption of fuel in the internal combustion engine stopped, in accordance with an operation of a change operation member.

4. The vehicular control apparatus according to claim 3, wherein
the change operation member selects, as a shift range, either a drive range or a free-running range:
the drive range enables start of the internal combustion engine corresponding to braking operation for the vehicle; and
the free-running range disables start of the internal combustion engine corresponding to braking operation for the vehicle.

5. A vehicle control apparatus comprising:
an electronic control unit configured to perform control of a vehicle, wherein when the vehicle is in a state other than an acceleration running state, the electronic control unit is configured to:
enable start of an internal combustion engine that generates a motive power applied to a driving wheel of the vehicle when a speed of the vehicle is lower than a predetermined vehicle speed; and
disable start of the internal combustion engine when the speed of the vehicle is equal to or higher than the predetermined vehicle speed.

6. A vehicle control apparatus comprising:
an electronic control unit configured to control an internal combustion engine of a vehicle, wherein
the internal combustion engine generates a motive power applied to a driving wheel of the vehicle; and
when a speed of the vehicle is equal to or higher than a predetermined vehicle speed, and the vehicle runs in a coasting manner with consumption of fuel in the internal combustion engine stopped, the electronic control unit prohibits start of the internal combustion engine corresponding to braking operation for the vehicle.

* * * * *